UNITED STATES PATENT OFFICE.

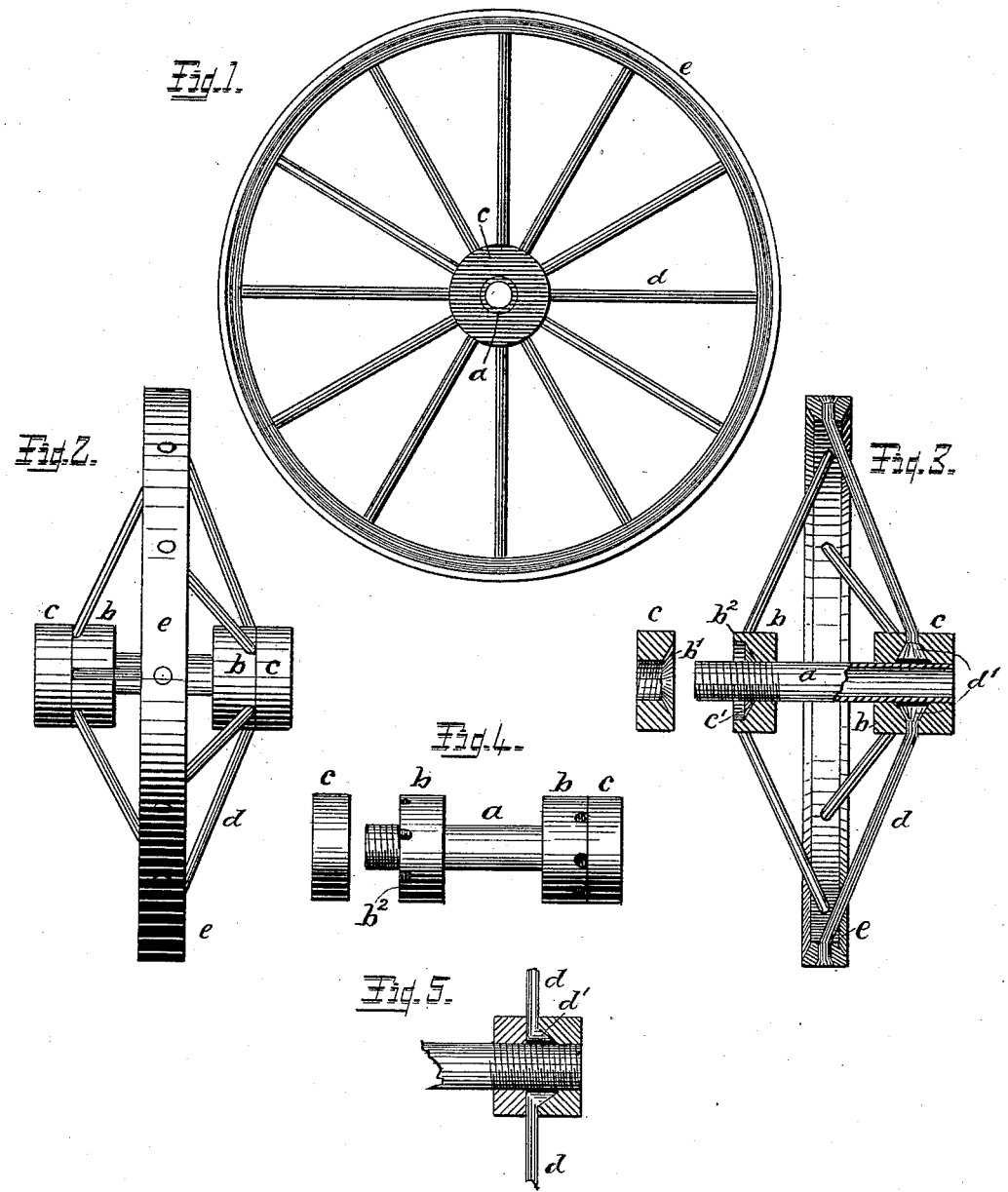

CLARENCE H. STRAIGHT, OF BRYAN, OHIO, ASSIGNOR OF ONE-HALF TO DAVID A. GARVER, OF SAME PLACE.

WHEEL FOR VEHICLES.

SPECIFICATION forming part of Letters Patent No. 391,987, dated October 30, 1888.

Application filed December 29, 1887. Serial No. 259,322. (No model.)

*To all whom it may concern:*

Be it known that I, CLARENCE H. STRAIGHT, a citizen of the United States, residing at Bryan, in the county of Williams and State of Ohio, have invented certain new and useful Improvements in Wheels for Vehicles; and I do hereby declare the following to be a full, clear, and exact description of the invention, such as will enable others skilled in the art to which it appertains to make and use the same.

This invention relates to wheels constructed entirely of metal, and has for its object the production of a light, strong, simple, and durable wheel for agricultural implements, wheelbarrows, baby-carriages, small express-wagons, and other light vehicles, and which shall be capable of easy adjustment to tighten up the parts when the wheel becomes loose from the stretching of the spokes or from wear.

To these ends the invention consists in a divided hub composed of four disks or plates adjustably arranged on an axle box or tube and disposed in pairs on opposite sides of the plane of the rim of the wheel, one or both of the plates of each pair having in their adjacent faces conical depressions or cavities to form a conical chamber between the plates of each pair, and in providing the inner ends of the spokes with wedge-shaped or conical heads, which are received in said chambers, whereby the adjustment of the plates of either pair toward each other will force the contained heads of the spokes inward and tighten the wheel.

In the accompanying drawings, which illustrate my invention and form a part of this specification, Figure 1 is a side elevation of my wheel. Fig. 2 is an edge view. Fig. 3 is a sectional elevation. Fig. 4 is a side view of the hub with one of its parts detached, and Fig. 5 is a sectional view of a modification.

$a$ designates a cylindrical tube, which receives the axle, and which may therefore be denominated the "box." Both ends of this box are exteriorly screw-threaded, the threads running toward the center a sufficient distance to receive and hold the parts of the interiorly-threaded hub. The hub is composed of four parts, (marked $b\,b$ and $c\,c$,) which are screwed in pairs upon opposite ends of the box $a$, one of the parts $b$ and one of the parts $c$ constituting a pair. The parts $b\,c$ of each pair are formed with conical recesses or cavities $b'\,c'$ in their adjacent faces, the conical cavities in the inner parts, $b$, being formed in the bottoms of cylindrical cavities, the latter forming annular flanges $b^2$, of a length corresponding with the thickness of the spokes. These flanges are notched at intervals (see Figs. 2 and 4) to receive the spokes $d$, which are provided at their ends with conical or wedge-shaped heads $d'$, which fit the conical cavities in the two parts $b\,c$ of the hub when they are put together, and which prevent the spokes from pulling out. The outer ends of the spokes project through the rim or tire $e$, and are secured by upsetting or riveting, as usual in wheels of this class.

The parts $b\,b$ of the hub are arranged on the box $a$ on opposite sides of the plane of the rim or tire $e$, and the spokes are alternately connected with said two parts to give strength and rigidity to the wheel, as is also usual in wheels of this class.

The conical heads $d'$ at the inner ends of the spokes are somewhat shorter than the radial space between the flanges $b^2$ and the box $a$, (see Fig. 3,) and this affords a means for tightening the wheel within certain limits, as by screwing the outer parts, $c$, of the hubs toward the inner parts, $b$, the chambers formed by the conical recesses in the two parts will be shortened and the heads $d'$ will be crowded inward, thus taking up the slack of the spokes and tightening the wheel.

In the modification represented in Fig. 5 the inner ends of the spokes are not headed, as above described, but the extreme ends are bent out at substantially a right angle, and the outer surfaces of the bent-out ends are beveled to correspond with the inclined wall of the conical recess in the part $c$. By screwing the latter up the same tightening effect is produced, as above described. In this case the part $b$ is not recessed, but is formed with radial grooves across its outer face to receive the spokes.

Having thus described my invention, I claim as new—

1. In a metal wheel, the combination, with the central tube or box, $a$, the rim or tire $e$, and the spokes, the latter being provided at their inner ends with conical or wedge-shaped heads $d'$, of the hub composed of four plates or disks, $b\ b$ and $c\ c$, adjustably arranged in pairs on opposite sides of the plane of the rim or tire, one or both of the plates of each pair having conical annular recesses or cavities in their adjacent faces to form chambers for the reception of the heads of the spokes, whereby the adjustment of the plates of either pair toward each other will force the heads of the spokes inward and tighten the wheel.

2. In a metal wheel, the combination, with the central tube or box, $a$, the rim or tire $e$, and the spokes, the latter being provided at their inner ends with conical or wedge-shaped heads $d'$, of the hub composed of four plates or disks, $b\ b$ and $c\ c$, adjustably arranged in pairs on opposite sides of the plane of the rim or tire, each pair having an interior conical chamber for the reception of the heads of the spokes, and one plate of each pair having radial grooves or notches to receive and hold the spokes, the disks of each pair being adjustable toward each other to force the heads of the spokes inward and tighten the wheel while the spokes are held in proper radial position.

In testimony whereof I affix my signature in presence of two witnesses.

CLARENCE H. STRAIGHT.

Witnesses:
JOHN B. WHITE,
WILLIAM W. DARBY.